US008832527B2

(12) United States Patent
Cheng

(10) Patent No.: US 8,832,527 B2
(45) Date of Patent: Sep. 9, 2014

(54) METHOD OF STORING SYSTEM DATA, AND MEMORY CONTROLLER AND MEMORY STORAGE APPARATUS USING THE SAME

(71) Applicant: Phison Electronics Corp., Miaoli (TW)

(72) Inventor: Shun-Bin Cheng, Miaoli County (TW)

(73) Assignee: Phison Electronics Corp., Miaoli (TW)

( * ) Notice: Subject to any disclaimer, the term of this patent is extended or adjusted under 35 U.S.C. 154(b) by 173 days.

(21) Appl. No.: 13/656,754

(22) Filed: Oct. 22, 2012

(65) Prior Publication Data

US 2014/0068383 A1    Mar. 6, 2014

(30) Foreign Application Priority Data

Aug. 30, 2012 (TW) .............................. 101131578 A

(51) Int. Cl.
  *G11C 29/00* (2006.01)
  *G06F 11/16* (2006.01)
  *G06F 12/00* (2006.01)
(52) U.S. Cl.
  CPC ................ *G06F 11/16* (2013.01); *G06F 12/00* (2013.01)
  USPC ..................................... 714/763; 365/185.12

(58) Field of Classification Search
  CPC .................................. G06F 11/16; G06F 12/00
  USPC ............................... 714/6.3, 763; 365/185.12
  See application file for complete search history.

(56) References Cited

U.S. PATENT DOCUMENTS

2014/0029341 A1* 1/2014 In .............................. 365/185.12

* cited by examiner

*Primary Examiner* — Sam Rizk
(74) *Attorney, Agent, or Firm* — Jianq Chyun IP Office

(57) ABSTRACT

A method of storing system data, and a memory controller and a memory storage apparatus using the same are provided. The method includes determining whether the unused storage space of a system physical erase unit is enough for storing updated system data. The method further includes, if the unused storage space of the system physical erase unit is not enough for storing the updated system data, selecting an empty physical erase unit, writing the updated system data into at least one first physical program unit of the selected physical erase unit and writing dummy data into a second physical program unit of the selected physical erase unit.

24 Claims, 8 Drawing Sheets

METHOD OF STORING SYSTEM DATA, AND MEMORY CONTROLLER AND MEMORY STORAGE APPARATUS USING THE SAME

CROSS-REFERENCE TO RELATED APPLICATION

This application claims the priority benefit of Taiwan application serial no. 101131578, filed on Aug. 30, 2012. The entirety of the above-mentioned patent application is hereby incorporated by reference herein and made a part of this specification.

BACKGROUND

1. Technology Field

The present invention is directed to a method of storing system data and a memory controller and a memory storage apparatus using the same.

2. Description of Related Art

Along with the widespread of digital cameras, cell phones, and MP3 in recently years, the consumers' demand for storage media has increased drastically. Since a rewritable non-volatile memory has the characteristics of non-volatility of data, low power consumption, small volume, non-mechanical structure, and fast reading and writing speed, the rewritable non-volatile memory is the most adaptable memory applied in a portable electronic product, e.g., a notebook computer. A solid state drive (SSD) is a storage apparatus which utilizes a flash memory as its storage medium. Therefore, the flash memory industry has become a very popular part of the electronic industry in recent years.

The flash memory has a plurality of physical blocks, and each of the physical blocks has a plurality of physical pages, wherein data has to be written to the physical block according to a sequence of the physical pages. Moreover, the physical pages where data has been written have to be erased first for again writing data thereto. Particularly, the physical block is the smallest unit that can be erased, and the physical page is the smallest unit that can be programmed. Therefore, typically, the physical blocks of the flash memory are mapped in alternation to logical addresses accessed by the host system so as to store data to be written by the host system. In order to effectively manage the physical blocks storing data in alternation, the memory controller establishes related management information (e.g. a mapping table) according to the standards of the flash memory when the flash memory storage apparatus is initialized and updates and maintains the same when the memory storage apparatus is in operation. For instance, the memory controller records the management information in one or more physical blocks (also referred to as system physical blocks). When no storage space is available for the system physical block, the memory controller configures another empty physical block as a new system physical block to write new management information and performs the erasing operation on the old system physical block.

However, during the operation of the memory storage apparatus, a power failure may occur, which results in a data write failure and the physical block incompletely storing data. Specifically, if the newly stored management information contains too many error bits due to the power failure and the old management information has been erased, the memory controller can not load any management information so that the memory storage apparatus is unable to operate normally. Accordingly, how to securely store the management information for the flash memory is one of the major concerns of artisans in the technical field.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a method of storing system data, a memory controller and a memory storage apparatus using the method for securely storing system data.

According to an exemplary embodiment of the present invention, a method of storing system data for a memory storage apparatus is provided. The memory storage apparatus has a rewritable non-volatile memory module. The rewritable non-volatile memory module has a plurality of physical erase units. Each of the physical erase units has a plurality of physical program units. A first physical erase unit among the physical erase units stores system data. The method of storing the system data includes determining whether an unused storage space of the first physical erase unit is sufficient to store updated system data. The method of storing the system data further includes, if the unused storage space of the first physical erase unit is insufficient to store the updated system data, selecting a second physical erase unit from the physical erase units, writing the updated system data to at least one first physical program unit among the physical program units in the second physical erase unit and writing dummy data to a second physical program unit among the physical program units in the second physical erase unit.

According to an exemplary embodiment of the present invention, a memory controller configured to control a rewritable non-volatile memory module is provided. The rewritable non-volatile memory module has a plurality of physical erase units. Each of the physical erase units has a plurality of physical program units. The memory controller includes a host interface, a memory interface and a memory management circuit. The host interface is configured to be coupled to a host system. The memory interface is configured to be coupled to the rewritable non-volatile memory module. The memory management circuit is coupled to the host interface and the memory interface. Here, the memory management circuit is configured to store system data to a first physical erase unit among the physical erase units. In addition, the memory management circuit is further configured to determine whether an unused storage space of the first physical erase unit is sufficient to store updated system data. If the unused storage space of the first physical erase unit is insufficient to store the updated system data, the memory management circuit is further configured to select a second physical erase unit from the physical erase units, write the updated system data to a first physical program unit among the physical program units in the second physical erase unit and write dummy data to a second physical program unit among the physical program units in the second physical erase unit.

According to an embodiment of the invention, a memory storage apparatus including a connector, a rewritable non-volatile memory module and a memory controller is provided. The connector is configured to be coupled to a host system. The rewritable non-volatile memory module a plurality of physical erase units, and each of the physical erase unit has a plurality of physical program units. The memory controller is coupled to the connector and the rewritable non-volatile memory module. Here, the memory controller is configured to store system data to a first physical erase unit among the physical erase units. In addition, the memory controller is further configured to determine whether an unused storage space of the first physical erase unit is sufficient to store updated system data. If the unused storage space of the first physical erase unit is insufficient to store the updated system data, the memory controller is further configured to select a second physical erase unit from the physical erase units, write the updated system data to a first physical program unit among the physical program units in the second physical erase unit and write dummy data to a second physical program unit among the physical program units in the second physical erase unit.

To sum up, the method of storing system data, the memory controller and the memory storage apparatus according to the embodiments of the present invention can securely store the system data so as to avoid losing the system data.

In order to make the aforementioned and other features and advantages of the present invention more comprehensible, several embodiments accompanied with figures are described in detail below.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

DESCRIPTION OF EMBODIMENTS

Figure 1:
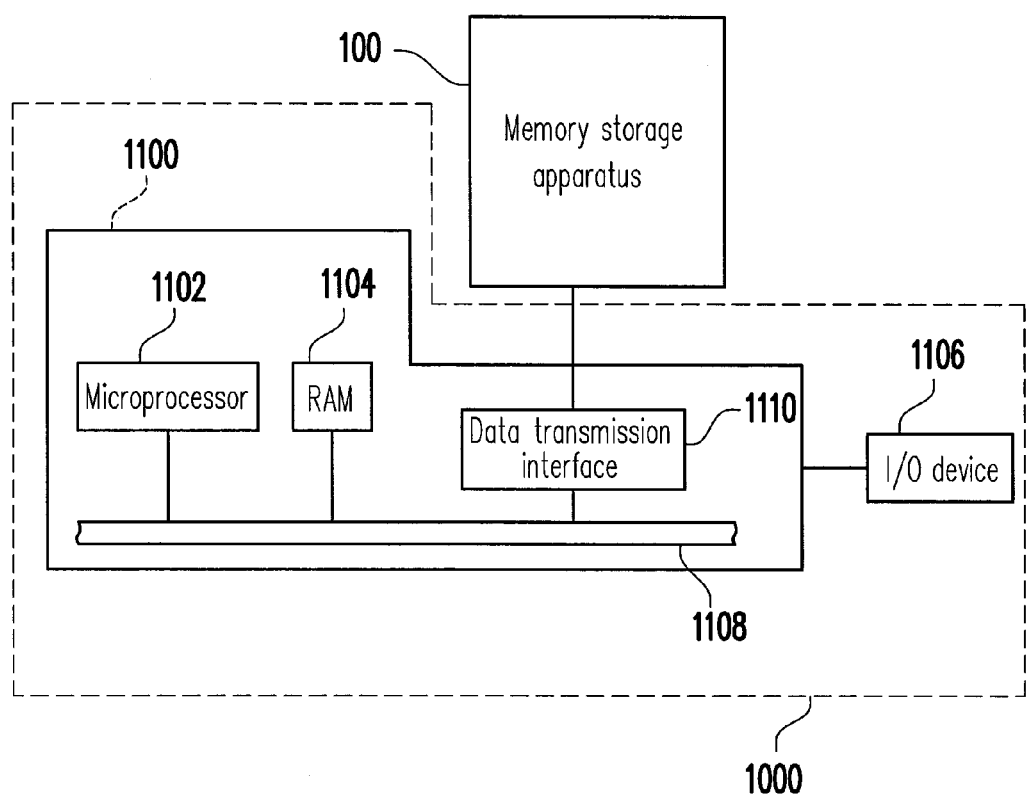
FIG. 1 illustrates a host system and a memory storage apparatus according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage apparatus (also referred to as a memory storage system) includes a rewritable non-volatile memory module and a controller (also referred to as a control circuit). A memory storage apparatus is typically used with a host system so that the host system can write data into or read data from the memory storage apparatus.

FIG. 1 illustrates a host system and a memory storage apparatus according to an exemplary embodiment of the present invention.

Figure 2:
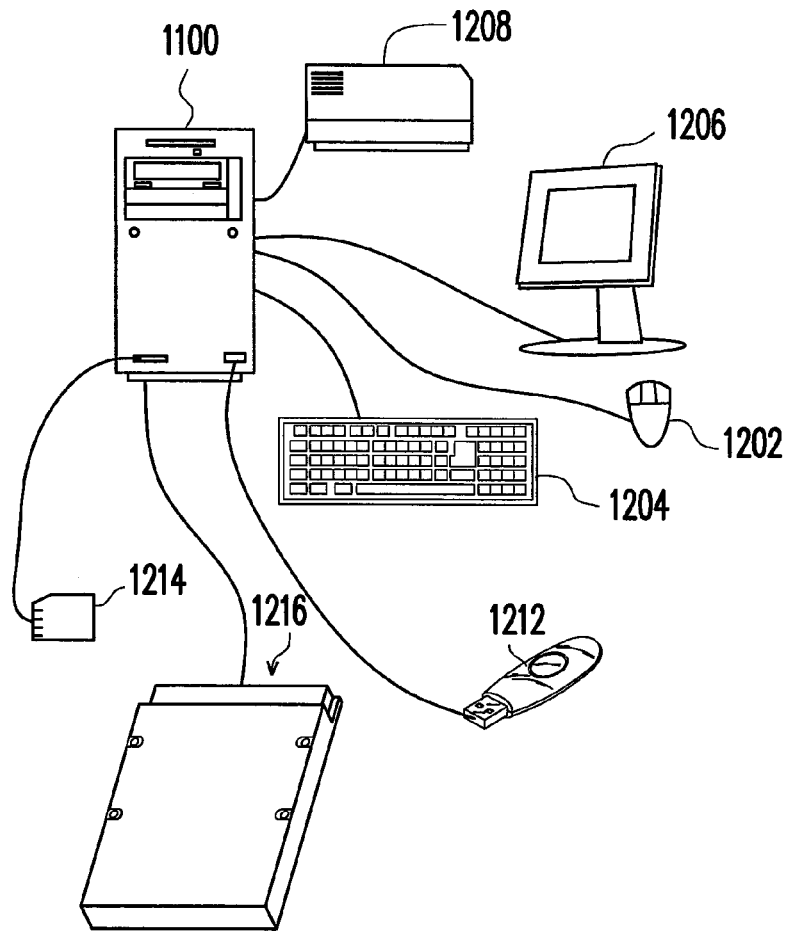
FIG. 2 is a diagram of a computer, an input/output device, and a memory storage apparatus according to an exemplary embodiment of the present invention.

Referring to FIG. 1, a host system 1000 typically includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1252, as shown in FIG. 2. However, the I/O device 1106 is not limited to the devices illustrated in FIG. 2 and may further include other devices. It should be understood that the devices illustrated in FIG. 2 is not intent to limit the I/O device 1106, and the I/O device 1106 may further include any other device.

In the present exemplary embodiment of the present invention, the memory storage apparatus 100 is coupled to other elements of the host system 1000 via the data transmission interface 1110. Data can be written into or read from the memory storage apparatus 100 through the operations of the microprocessor 1102, the RAM 1104, and the I/O device 1106. For example, the memory storage apparatus 100 may be a rewritable non-volatile memory storage apparatus such as a flash drive 1256, a memory card 1214, or a solid state drive (SSD) 1216 as shown in FIG. 2.

Figure 3:
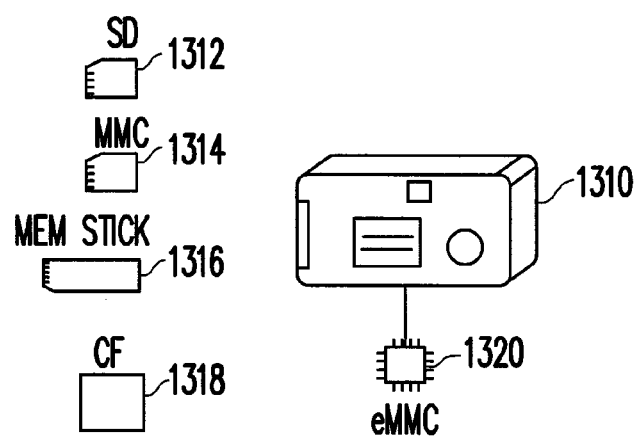
FIG. 3 is a diagram illustrating a host system and a memory storage apparatus according to an exemplary embodiment of the present invention.

Generally, the host system 1000 may substantially be any system capable of operating with the memory storage apparatus 100 to storing data. Although the host system 1000 is described as a computer system in the present exemplary embodiment, in another exemplary embodiment of the invention, the host system 1000 may be a digital camera, a video camera, a telecommunication device, an audio player, or a video player. For example, if the host system is a digital camera (video camera) 1310, the rewritable non-volatile memory storage apparatus may be a SD card 1312, a MMC card 1314, a memory stick 1316, a CF card 1318 or an embedded storage device 1320 (as shown in FIG. 3). The embedded storage device 1320 includes an embedded MMC (eMMC). It should be mentioned that the eMMC is directly coupled to a substrate of the host system.

Figure 4:
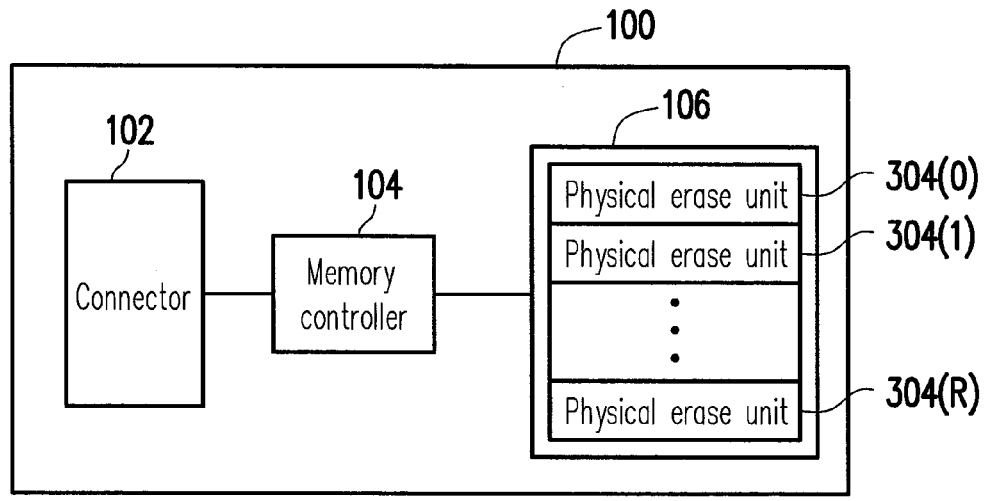
FIG. 4 is a schematic block diagram illustrating a memory storage apparatus according to an exemplary embodiment of the present invention.

FIG. 4 is a schematic block diagram illustrating a memory storage apparatus according to an exemplary embodiment of the present invention.

Referring to FIG. 4, the memory storage apparatus 100 includes a connector 102, a memory controller 104 and a rewritable non-volatile memory module 106.

In the present exemplary embodiment, the connector 102 is compatible to a Secure Digital (SD). However, it should be noted that the present invention is not limited thereto, and the connector 102 may also be compatible to a Parallel Advanced Technology Attachment (PATA) standard, an Institute of Electrical and Electronic Engineers (IEEE) 1394 standard, a peripheral component interconnect (PCI) Express interface standard, a universal serial bus (USB) standard, a serial advanced technology attachment (SATA) standard, a Ultra High Speed-I (UHS-I) interface standard, a Ultra High Speed-II (UHS-II) interface standard, a memory stick (MS) interface standard, a multi media card (MMC) interface standard, an embedded MMC (eMMC) interface standard, a Universal Flash Storage (UFS) interface standard, a compact flash (CF) interface standard, an integrated device electronics (IDE) interface standard or any other suitable standard.

The memory controller 104 is configured to execute a plurality of logic gates or control commands which are implemented in a hardware form or in a firmware form and performs operations such as data writing, data reading and data erasing in the rewritable non-volatile memory module 106 according to the commands from the host system 1000.

The rewritable non-volatile memory module 106 is coupled to the memory controller 104 and configured to store data written by the host system 1000. The rewritable non-volatile memory module 106 has multiple physical erase units 304(0) to 304(R). For example, the physical erase units 304(0) to 304(R) may belong to the same memory die or belong to different memory dies. Each physical erase unit has at least one physical program unit, and the physical program units belonging to the same physical erase unit may be written separately and erased simultaneous. For example, each physical erase unit is composed of 128 physical program units. Nevertheless, it should be understood that the present invention is not limited thereto. Each physical erase unit may also be composed of 64 physical program units, 256 physical program units or any amount of the physical program units.

In detail, the physical erase unit is the smallest unit for erasing. Namely, each physical erase unit contains the least number of memory cells to be erased together. The physical program unit is the smallest unit for programming. Namely, the physical program unit is the smallest unit for writing data.

In particular, according to the number of bits which each memory cell thereof is capable of storing, a NAND flash memory may be classified into a single level cell (SLC) NAND flash memory, a multi level cell (MLC) NAND flash memory, or a trinary level cell (TLC) NAND flash memory. Specifically, each memory cell in the SLC NAND flash memory can store one bit of data (i.e., "1" or "0"), each memory cell in the MLC NAND flash memory can store two bits of data, and each memory cell in the TLC NAND flash memory can store three bits of data.

In the NAND flash memory, a physical program unit is composed of several memory cells arranged on the same word line. Since each memory cell in the SLC NAND flash memory can store one bit of data, several memory cells arranged on the same word line in the SLC NAND flash memory correspond to one physical program unit.

In opposite to the SLC NAND flash memory, a floating gate storage layer in each memory cell of the MLC NAND flash memory can store two bits of data, and a storage state (i.e., "11," "10," "01," or "00") thereof includes the least significant bit (LSB) and the most significant bit (MSB). For instance, the first bit from the left of the storage states is the LSB, and the second bit from the left of the storage states is the MSB. Accordingly, several memory cells arranged on the same word line may constitute two physical program units, wherein the physical program units constituted by the LSB and the MSB of the memory cells are lower physical program units and upper physical program units, respectively. Specifically, the speed of writing data to the lower physical program unit is faster than writing data to the upper physical program unit, and when a failure occurs during programming the upper physical program unit, the data stored in the lower physical program unit may be lost.

Similarly, in the TLC NAND flash memory, each memory cell can store three bits of data, and storage state (i.e., "111," "110," "101," "100," "011," "010," "001," or "000") thereof includes the first bit (i.e., the LSB), the second bit (i.e., the center significant bit, CSB), and the third bit (i.e., the MSB) from the left of the storage states. Accordingly, several memory cells arranged on the same word line may constitute three physical program units, wherein the physical program units constituted by the LSB, the CSB, and the MSB of the memory cells are lower physical program units, middle physical program units, and upper physical program units, respectively. Likewise, comparing with the middle physical program unit and the upper physical program unit, the lower physical program unit has better stability, and the speed of writing data to the lower physical program unit is faster than the speed of writing data to the middle physical program unit and the upper physical program unit.

Each physical program unit commonly includes a data bit area and a redundancy bit area. The data bit area includes a plurality of physical access addresses for storing user data, and the redundancy bit area is used for storing system data (e.g. control information and error checking and correcting (ECC) codes). In the present exemplary embodiment, the data bit area in each physical program unit includes 4 physical access addresses, and the size of each physical access address is 512 bytes. However, in other exemplary embodiments, the data bit area may include a larger or a smaller number of physical access addresses, and the invention is not intent to limit to the size and the number of the physical access addresses. For example, in an exemplary embodiment, a physical erase unit is a physical block, and a physical program unit is a physical page or a physical sector, but the present invention is not limited thereto.

In the present exemplary embodiment, the rewritable non-volatile memory module 106 is a MLC NAND flash memory module, but the present invention is not limited thereto. The rewritable non-volatile memory module 106 may also be a SLC NAND flash memory module, a TLC NAND flash memory module, any other flash memory module or any other memory module having the same characteristics.

Figure 5:
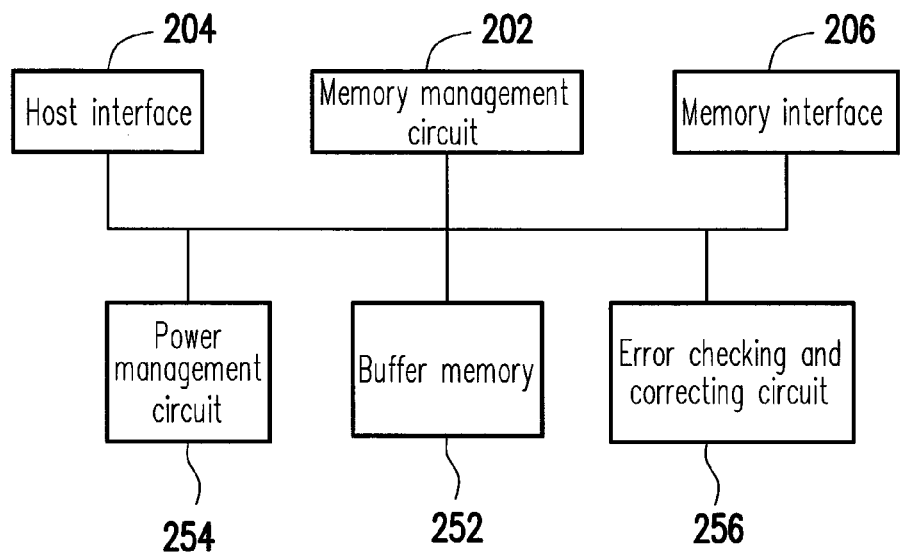
FIG. 5 is a schematic block diagram illustrating a memory controller according to an exemplary embodiment of the present invention.

FIG. 5 is a schematic block diagram illustrating a memory controller according to an exemplary embodiment of the present invention. It is to be understood that the structure of the memory controller illustrated in FIG. 5 is merely an example, and the present invention is not limited thereto.

Referring to FIG. 5, a memory controller 104 includes a memory management circuit 202, a host interface 204 and a memory interface 206.

The memory management circuit 202 is configured to control the overall operation of the memory controller. To be specific, the memory management circuit 202 has a plurality of control instructions, and when the memory storage apparatus 100 is in operation, the control instructions are executed to perform operations such as data writing, data reading, data erasing and so forth.

In the present exemplary embodiment, the control instructions of the memory management circuit 202 are implemented in a firmware form. For example, the memory management circuit 202 has a microprocessor unit (not shown) and a read-only memory (ROM, not shown), and the control instructions are burnt into the ROM. When the memory storage apparatus 100 is in operation, the control instructions are executed by the microprocessor unit to perform operations such as data writing, data reading, data erasing and so forth.

In another exemplary embodiment of the invention, the control instructions of the memory management circuit 202 may also be stored as program codes in a specific area of the rewritable non-volatile memory module 106 (for example, a system area exclusively used for storing system data in a memory module). Besides, the memory management circuit 202 has a microprocessor unit (not shown), a ROM (not shown), and a RAM (not shown). In particular, the ROM has boot codes, and when the memory controller 104 is enabled, the microprocessor unit first executes the boot codes to load the control instructions from the rewritable non-volatile memory module 106 into the RAM of the memory management circuit 202. Thereafter, the microprocessor unit executes the control instructions to perform operations such as data writing, data reading, data erasing and so forth.

Further, in another exemplary embodiment of the present invention, the control instructions of the memory management circuit 202 may also be implemented in a hardware form. For instance, the memory management circuit 202 includes a micro controller, a memory cell management circuit, a memory writing circuit, a memory reading circuit, a memory erasing circuit and a data processing circuit. These circuits are coupled to the micro controller. Therein, the memory cell management circuit is configured to manage physical erase units of the rewritable non-volatile memory module 106. The memory writing circuit is configured to issue a write instruction to the rewritable non-volatile memory module 106 for writing data thereto. The memory reading circuit is configured to issue a read instruction to the rewritable non-volatile memory module 106 for reading data therefrom. The memory erasing circuit is configured to issue an erase instruction to the rewritable non-volatile memory module 106 for erasing data therefrom. And, the data processing circuit is configured to process data that is about to be written to the rewritable non-volatile memory module 106 or data read from the rewritable non-volatile memory module 106.

The host interface 204 is coupled to the memory management circuit 202 and configured to receive and identify instructions and data transmitted from the host system 1000. Namely, the instructions and data are transmitted from the host system 1000 to the memory management circuit 202 through the host interface 204. In the present exemplary embodiment, the host interface 204 complies with the SD standard. However, it is should be noted that the present invention is not limited thereto, and the host interface 204 can also comply with the PATA standard, the IEEE 1394 standard, the PCI Express standard, the USB standard, the SATA standard, the UHS-I interface standard, the UHS-II interface standard, the MS standard, the MMC standard, the eMMC interface standard, the UFS interface standard, the CF standard, the IDE standard, or any other appropriate data transmission standard.

The memory interface 206 is coupled to the memory management circuit 202 and configured to access the rewritable non-volatile memory module 106. In other words, data that is about to be written to the rewritable non-volatile memory module 106 is transformed to an acceptable format for the rewritable non-volatile memory module 106 by the memory interface 206.

In an exemplary embodiment of the present invention, the memory controller 104 further includes a buffer memory 252, a power management circuit 254 and an error checking and correcting circuit 256.

The buffer memory 252 is coupled to the memory management circuit 202 and configured to temporarily store the data and instructions from the host system 1000 or the data from the rewritable non-volatile memory module 106.

The power management circuit 254 is coupled to the memory management circuit 202 and configured to control the power of the memory storage apparatus 100.

The error checking and correcting circuit 256 is coupled to the memory management circuit 202 and configured to perform an error checking and correcting procedure to ensure the accuracy of data. In the present exemplary embodiment, when the memory management circuit 202 receives a write instruction from the host system 1000, the error checking and correcting circuit 256 generates an error checking and correcting code (ECC code) corresponding to data corresponding to the write instruction, and the memory management circuit 202 then writes the data corresponding to the write instruction and the corresponding ECC code to the rewritable non-volatile memory module 106. Afterwards, when reading data from the rewritable non-volatile memory module 106, the memory management circuit 202 also reads the corresponding ECC code, and the error checking and correcting circuit 256 executes an error checking and correcting procedure on the read data according to the ECC code. In particular, the error checking and correcting circuit 256 is configured as capable of correcting a number of error bits (which is referred to as a maximum number of correctable error bits hereinafter). For example, the maximum number of correctable error bits is 24. If a number of the error bits occurring in the read data is not more than 24, the error checking and correcting circuit 256 corrects the error bits back to accurate values according to the ECC code. Otherwise, the error checking and correcting circuit 256 reports a failure of error correcting, and the memory management circuit 202 transmits a message indicating that the data is lost to the host system 1000.

Figure 6:
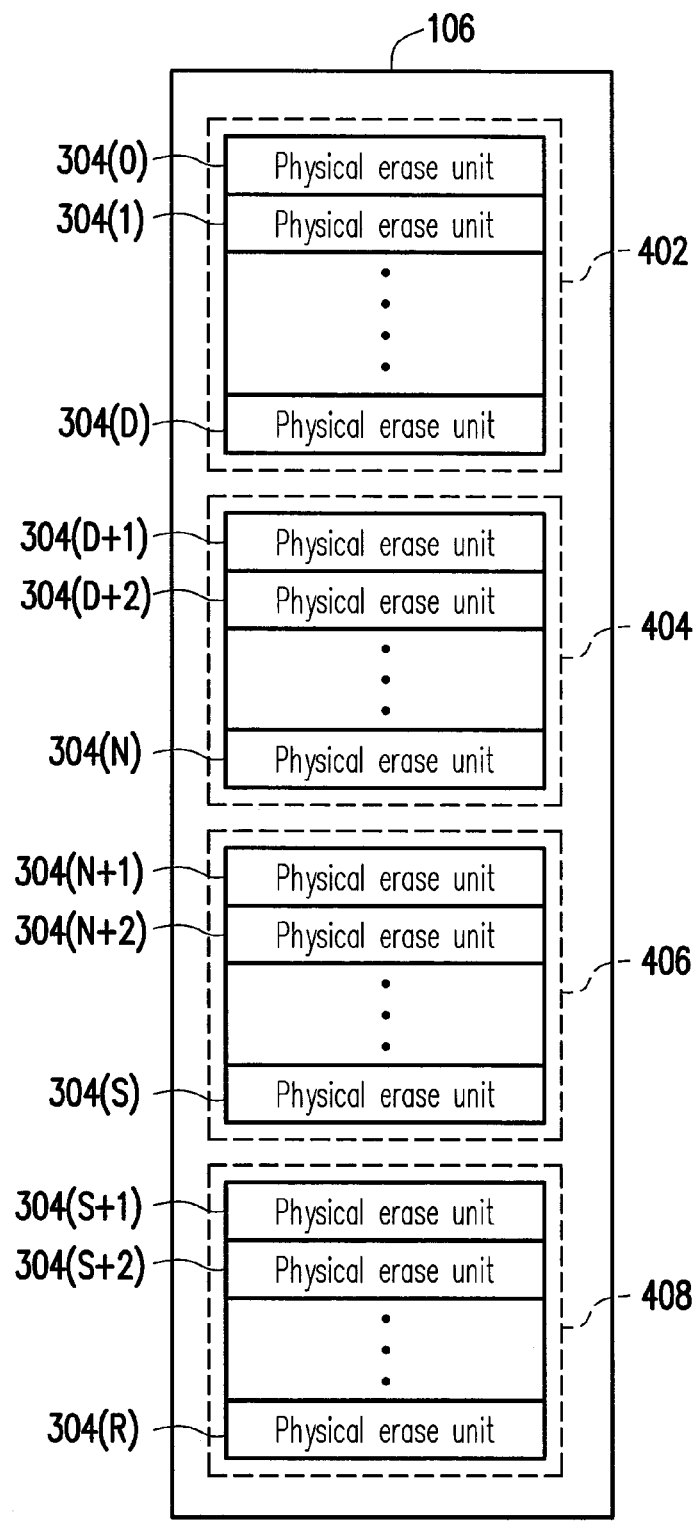
FIG. 6 and FIG. 7 are diagrams illustrating an example of managing a rewritable non-volatile memory module according to an exemplary embodiment of the present invention.
Figure 7:
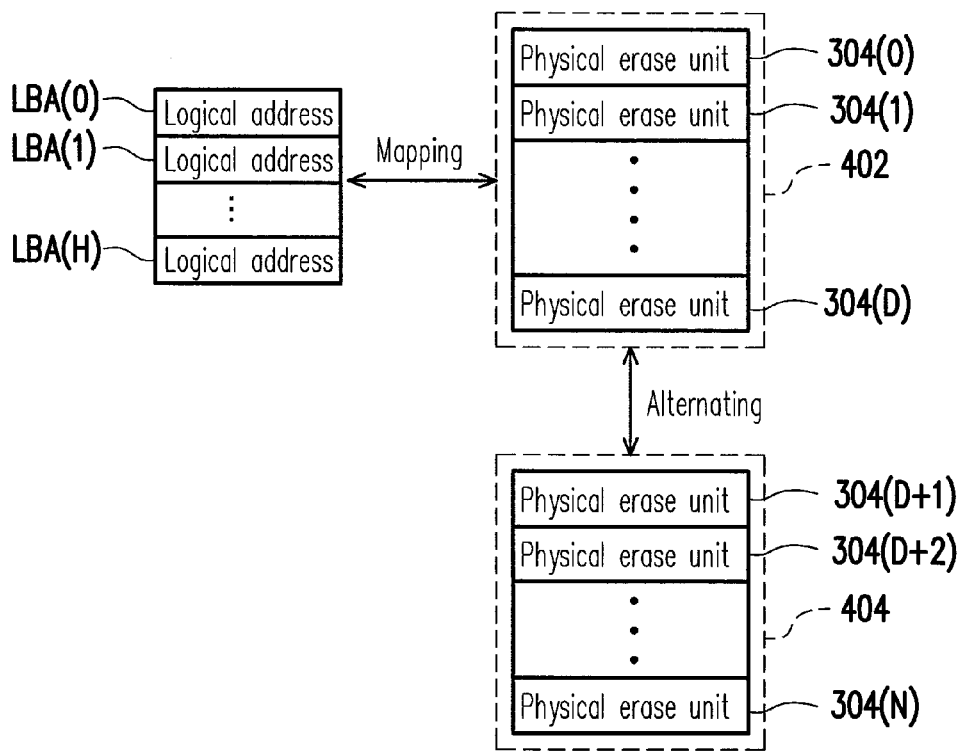

FIG. 6 and FIG. 7 are diagrams illustrating an example of managing a rewritable non-volatile memory module according to an exemplary embodiment of the present invention.

It should be understood that the terms used herein for describing the operations (for example, "get", "select", "replace", "group", and "alternate", etc) performed on the physical erase units of the memory module 106 refer to logical operations performed on these physical erase units. Namely, the actual positions of the physical erase unit are not changed in the rewritable non-volatile memory module and the physical erase units are only logically operated in the rewritable non-volatile memory module.

Referring to FIG. 6, the memory controller 104 (or the memory management circuit 202) logically groups (or assigns) the physical erase units 304(0)~304(R) of the rewritable non-volatile memory module 106 into to a data area 402, a spare area 404, a system area 406 and a replacement area 408.

The physical erase units logically belonging to the data area 402 and the spare area 404 are used for storing data from the host system 1000. In particular, the physical erase units of the data area 402, which are also referred to as data physical erase units, are assigned as the physical erase units for stored data, and the physical erase units of the spare area 404, which are also referred to as spare physical erase unit, are assigned as the physical erase units for writing new data. For example, when receiving a write instruction and data to be written from the host system 1000, the memory controller 104 (or the memory management circuit 202) gets a physical erase unit the spare area 404, organizes the data to be written and writes the data into the gotten physical erase unit.

The physical erase units logically belonging to the system area 406 are configured for recording system data. The system data includes related information, such as a manufacturer and a model of a memory chip, the number of the physical erase units of the memory chip, and the number of the physical program units in each physical erase unit, a mapping table. Specifically, when a physical erase unit is sparely prepared for writing system data, the memory controller 104 (or the memory management circuit 202) records a mark of a system physical erase unit in the redundancy bit area of the physical program unit in the physical erase unit to identify that the physical erase unit is configured as a system physical erase unit to store system data. It is to be mentioned that since the system data is quite important to the memory storage apparatus 100, in the exemplary embodiment where the rewritable non-volatile memory module 106 is a MLC NAND flash memory module or a TLC NAND flash memory module, the memory controller 104 (or the memory management circuit 202) merely uses lower physical program units in the system physical erase unit to store the system data to ensure the reliability of data.

The physical erase units belonging to the replacement area 408 are substitute physical erase units. For example, when the rewritable non-volatile memory module 106 is manufactured in the factory, 4% of the physical erase units thereof are reserved for replacement. Namely, when any physical block in the data area 402, the spare area 404, and the system area 406 is damaged, a physical erase units reserved in the replacement area 408 is used for replacing the damaged physical erase units (i.e. the bad physical erase unit or the bad block). Thus, if there are still normal physical erase units in the replacement area 408 and a physical block is damaged, the memory controller 104 (or the memory management circuit 202) gets a normal physical erase unit from the replacement area 408 for replacing the damaged physical block. If there are no more normal physical erase units in the replacement area 408 and a physical erase unit is damaged, the memory controller 104 declares that the whole memory storage apparatus 100 is in a write-protect status, and no more data is allowed to be written thereto.

In particular, the numbers of physical erase units in the data area 402, the spare area 404, the system area 406 and the replacement area 408 are various based on different memory standards. Additionally, it should be understood that during the operation of the memory storage apparatus 100, the grouping relationships of associating the physical erase units with the data area 402, the spare area 404, the system area 406 and the replacement area 408 are dynamically changed. For example, when a physical erase unit of the spare area 404 is damaged and replaced by a physical erase unit of the replacement area 408, the physical erase unit initially located at the replacement area 408 is associated with the spare area 404.

Referring to FIG. 7, as described above, the physical erase units in the data area 402 and the spare area 404 are alternated to store data written by the host system 1000. In the present exemplary embodiment, the memory controller 104 (or the memory management circuit 202) configures logical addresses LBA(0)~LBA(H) for the host system 1000 to properly access data. Each logical address is composed of several sectors. For example, in the present exemplary embodiment, a logical address is composed of 4 sectors, but the present invention is not limited thereto. In another exemplary embodiment of the present invention, a logical address may also be composed of 8 sectors or 16 sectors. Typically, the numbers of the physical program units of the physical erase units in the data area 402 and the spare area 404 are greater than the number of the logical addresses.

For example, when the memory controller 104 (or the memory management circuit 202) starts to use the physical erase unit 304(0) to store data that is about to be written by the host system 1000, no matter which logical address that the data is written to by the host system 1000, the memory controller 104 (or the memory management circuit 202) writes the data to a physical program unit in the physical erase unit 304(0). When memory controller 104 (or the memory management circuit 202) starts to use the physical erase unit 304(1) to store data that is about to be written by the host system 1000, no matter which logical address that the data is written to by the host system 1000, the memory controller 104 (or the memory management circuit 202) writes the data to a physical program unit in the physical erase unit 304(1). That is to say, when the host system 1000 is about to write data, the memory controller 104 (or the memory management circuit 202) uses physical program units in a physical erase unit to write the data. Another physical erase unit where no data is stored is selected only when all of the physical program units in the physical erase unit are used up, and data is continuously written to physical program units of the newly selected physical erase unit.

In order to identify the physical program unit where data belonging to each logical address is stored, in the present exemplary embodiment, the memory controller 104 (or the memory management circuit 202) records the mapping relationship between the logical addresses and the physical program units. Meanwhile, when the host system 1000 is about to access data in a sector, the memory controller 104 (or the memory management circuit 202) confirms a logical address where the sector belongs to and accesses the data in a physical program unit mapped to the logical address. For example, in the present exemplary embodiment, the memory controller 104 (or the memory management circuit 202) stores a logical address mapping table in the system area 406 of the rewritable non-volatile memory module 106 for recording a physical program unit mapped to each logical address, and when the data is about to be accessed, the memory controller 104 (or the memory management circuit 202) loads and maintains the logical address mapping table in the buffer memory 252.

As described in the above, physical erase units 304(N+1)~304(S) are initially configured as system physical erase units in the system area 406 for storing system data. Generally, the system area 406 records various types of system data (e.g. a mapping table, a variable table and so forth), and each type of the system data has a size smaller than the storage capacity of a physical erase unit. Thus, the memory controller 104 (or the memory management circuit 202) respectively stores the various types of system data in different system physical erase unit and continuously writes updated system data to the corresponding physical program unit in the system physical erase unit.

Figure 8:
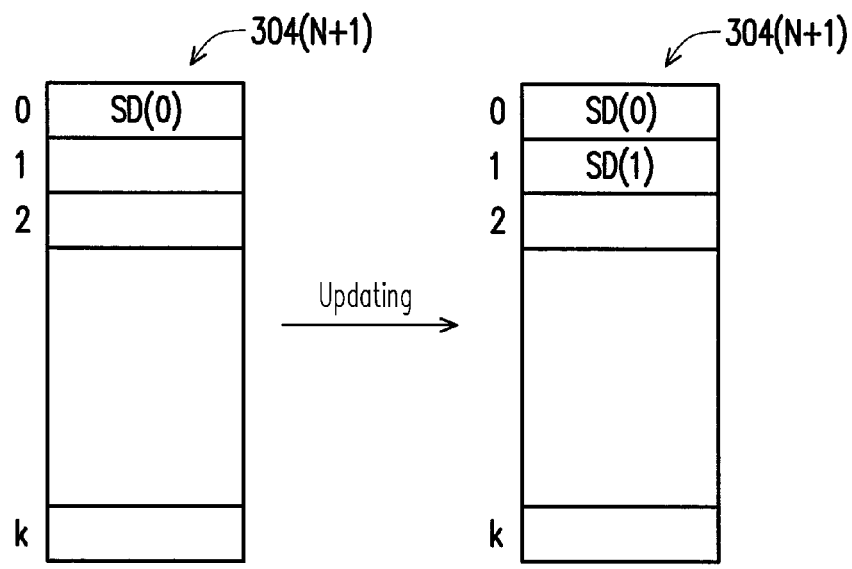
FIG. 8 illustrates an example of storing system data according to an exemplary embodiment of the present invention.

FIG. 8 illustrates an example of storing system data according to an exemplary embodiment of the present invention.

Referring to FIG. 8, here, it is assumed that the physical erase unit 304(N+1) is assigned to store a certain type of system data and the system data requires the storage capacity of one physical program unit. For example, system data SD(0) is stored in the $0^{th}$ physical program unit in the physical erase unit 304(N+1).

When the system data SD(0) is updated as system data SD(1), the memory controller 104 (or the memory management circuit 202) sequentially writes the system data SD(1) to the $1^{st}$ physical program unit in the physical erase unit 304(N+1). Likewise, new system data is sequentially written to physical program units in the physical erase unit 304(N+1). When the physical erase unit 304(N+1) is fully filled, the memory controller 104 (or the memory management circuit 202) selects an empty physical erase unit from the spare area 404 as a new system physical erase unit to write the updated system data.

Figure 9:
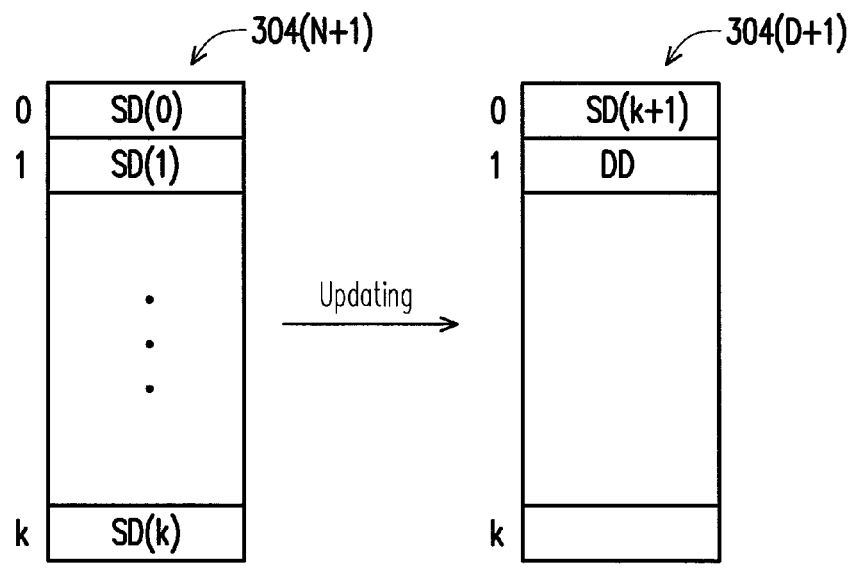
FIG. 9 illustrates another example of storing system data according to an exemplary embodiment of the present invention.

FIG. 9 illustrates another example of storing system data according to an exemplary embodiment of the present invention.

Referring to FIG. 9, when updated system data SD(K+1) is about to be written and the physical erase unit 304(N+1) is full of written data (i.e. the system data SD(0)~SD(K)), the memory controller 104 (or the memory management circuit 202) selects an empty physical program unit (e.g. physical erase unit 304(D+1)) from the spare area 404 and writes the system data SD(K+1) to the $0^{th}$ physical program unit of the physical erase unit 304(D+1).

In the present exemplary embodiment, after the system data SD(K+1) is written to the $0^{th}$ physical program unit of the physical erase unit 304(D+1), the memory controller 104 (or the memory management circuit 202) writes dummy data DD to a physical program unit of the physical erase unit 304(D+1). For example, the dummy data DD may be written to a physical program unit that is arranged next to the $0^{th}$ physical program unit in the physical erase unit 304(D+1), i.e. the $1^{st}$ physical program unit in the physical erase unit 304(D+1). Here, the dummy data DD may be any data and the present invention is not limited thereto.

Specifically, during the process of writing new system data to a new system physical erase unit, a power failure may be occur, which results in the influence on the reliability of the written data. Thus, in the present exemplary embodiment, the memory controller 104 (or the memory management circuit 202) performs the erasing operation on the old system physical erase unit only upon the confirmation that the dummy data is programmed to the new system physical erase unit.

For example, given that no power failure occurs in the memory storage apparatus 100, the memory controller 104 (or the memory management circuit 202) performs the erasing operation on the physical erase unit 304(N+1) and associates the physical erase unit 304(N+1) with the spare area 404 after the new system data SD(K+1) is successfully written to the $0^{th}$ physical program unit in the physical erase unit 304(D+1) and the dummy data DD is successfully written to the $1^{st}$ physical program unit in the physical erase unit 304(D+1).

Otherwise, given that a power failure occurs in the memory storage apparatus 100 during the process of writing the new system data SD(K+1) to the $0^{th}$ physical program unit in the physical erase unit 304(D+1) and writing the dummy data DD to the $1^{st}$ physical program unit in the physical erase unit 304(D+1), after the memory storage apparatus 100 is re-powered on, the memory controller 104 (or the memory management circuit 202) identifies that the old system physical erase unit (i.e. the physical erase unit 304(N+1) and the new system physical erase unit (i.e. the physical erase unit 304(D+1)) storing the same type of system data simultaneously exist in the system area 406 and further determines whether data is written to the $1^{st}$ physical program unit in the physical erase unit 304(D+1).

If the $1^{st}$ physical program unit in the physical erase unit 304(D+1) is determined as no data written thereto, the memory controller 104 (or the memory management circuit 202) identifies that the new system data SD(K+1) is not successfully written to the physical erase unit 304(D+1) and then performs the erasing operation on the physical erase unit 304(D+1) and associates the physical erase unit 304(D+1) with the spare area 404, accordingly. In particular, the rewritable non-volatile memory module 106 uses the physical program unit as the unit for the data writing operation, and thus, if data is not written to the $1^{st}$ physical program unit in the physical erase unit 304(D+1), it represents that the data writing operation performed on the $0^{th}$ physical program unit in the physical erase unit 304(D+1) may not be completed. In the case where the new system data SD(K+1) can not be confirmed to be successfully written to the physical erase unit 304(D+1), in the present exemplary embodiment, the memory controller 104 (or the memory management circuit 202) abandons the new system data SD(K+1) and continues to use the old system data SD(K) so as to ensure that the memory storage apparatus 100 may be operated normally.

If the $1^{st}$ physical program unit in the physical erase unit 304(D+1) is determined as having data written thereto, the memory controller 104 (or the memory management circuit 202) identifies that new system data SD(K+1) is successfully written to the physical erase unit 304(D+1), and then performs the erasing operation on the physical erase unit 304(N+1) and associates the physical erase unit 304(N+1) with the spare area 404, accordingly. In particularly, the rewritable non-volatile memory module 106 uses the physical program unit as the unit for the data writing operation and thus, if data is already written to the $1^{st}$ physical program unit in the physical erase unit 304(D+1), it represents that the data writing operation performed on the $0^{th}$ physical program unit in the physical erase unit 304(D+1) is completed. In the case where the system data SD(K+1) is confirmed to be written to the physical erase unit 304(D+1), the memory controller 104 (or the memory management circuit 202) erases the old system data stored in the physical erase unit 304(N+1) so as to allow the physical erase unit 304(N+1) to be used again.

For example, in the present exemplary embodiment, the memory controller 104 (or the memory management circuit 202) confirms whether the dummy data is written to a new system physical erase unit according to the ECC code and the mark of the system physical erase unit stored in redundancy bit area of the physical program unit used for writing the dummy data.

To be specific, in the case of the example illustrated in FIG. 9, when the memory storage apparatus 100 is re-powered on, and the old system physical erase unit (i.e. the physical erase unit 304(N+1)) and the new system physical erase unit (i.e. the physical erase unit 304(D+1)) storing the same type of system data simultaneously exist in the system area 406, the memory controller 104 (or the memory management circuit 202) reads data from the data bit area of the $1^{st}$ physical program unit in the physical erase unit 304(D+1) and reads the corresponding ECC code from the redundancy bit area of the $1^{st}$ physical program unit in the physical erase unit 304(D+1). Thereafter, the memory controller 104 (or the error checking and correcting circuit 256) performs an error checking and correcting procedure on the read data according to the read ECC code. If the read data is uncorrectable, the memory controller 104 (or the memory management circuit 202) identifies that data is already written to the $1^{st}$ physical program unit in the physical erase unit 304(D+1). If correctable error bits or no error bits exist in the read data has, the memory controller 104 (or the memory management circuit 202) further determines whether the redundancy bit area of the $1^{st}$ physical program unit in the physical erase unit 304(D+1)

records the mark of the system physical erase unit. If the mark of the system physical erase unit is recorded in the redundancy bit area of the $1^{st}$ physical program unit in the physical erase unit 304(D+1), the memory controller 104 (or the memory management circuit 202) identified that data is already written to the $1^{st}$ physical program unit in the physical erase unit 304(D+1). Otherwise, if no mark of the system physical erase unit is recorded in the redundancy bit area of the $1^{st}$ physical program unit in the physical erase unit 304 (D+1), the memory controller 104 (or the memory management circuit 202) identifies that data is not written to the $1^{st}$ physical program unit in the physical erase unit 304(D+1).

It should be mentioned that in an exemplary embodiment of the present invention, the memory controller 104 (or the memory management circuit 202) merely uses the lower physical program units in the system physical erase unit for storing the system data to ensure the reliability of data. For example, both the $0^{th}$ and the 1st physical program units in the physical erase unit 304(D+1) are lower physical program units.

However, the memory controller 104 (or the memory management circuit 202) may also use the corresponding upper physical program units to store the dummy data. For example, in an example, the $0^{th}$ physical program unit is a lower physical program unit in the physical erase unit 304(D+1), and the $1^{st}$ physical program unit is an upper physical program unit in the physical erase unit 304(D+1). Specifically, in the example where the $0^{th}$ physical program unit is a lower physical program unit in the physical erase unit 304(D+1) and the $1^{st}$ physical program unit is an upper physical program unit in the physical erase unit 304(D+1), the memory controller 104 (or the memory management circuit 202) further determines whether the mark of the system physical erase unit is recorded in the redundancy bit area of the $1^{st}$ physical program unit in the physical erase unit 304(D+1) when correctable error bits or no error bits exits in the data read from the $1^{st}$ physical program unit in the physical erase unit 304(D+1). Meanwhile, if the mark of the system physical erase unit is recorded in the redundancy bit area of the $1^{st}$ physical program unit in the physical erase unit 304(D+1), the memory controller 104 (or the memory management circuit 202) identifies that data is already written to the $1^{st}$ physical program unit in the physical erase unit 304(D+1). Otherwise, if no mark of the system physical erase unit is recorded in the redundancy bit area of the $1^{st}$ physical program unit in the physical erase unit 304(D+1), the memory controller 104 (or the memory management circuit 202) identifies that data is not written to the $1^{st}$ physical program unit in the physical erase unit 304(D+1).

It should be understood that even though FIG. 8 and FIG. 9 illustrate the example where the system data having the size that is smaller than or equal to the storage capacity of a physical program unit is stored, but the present invention is not limited thereto. In another exemplary embodiment of the present invention, the size of the system data may be larger than the storage capacity of a physical program unit. For example, the number of physical program units required for storing the system data may be 2, 3 or 4.

Figure 10:
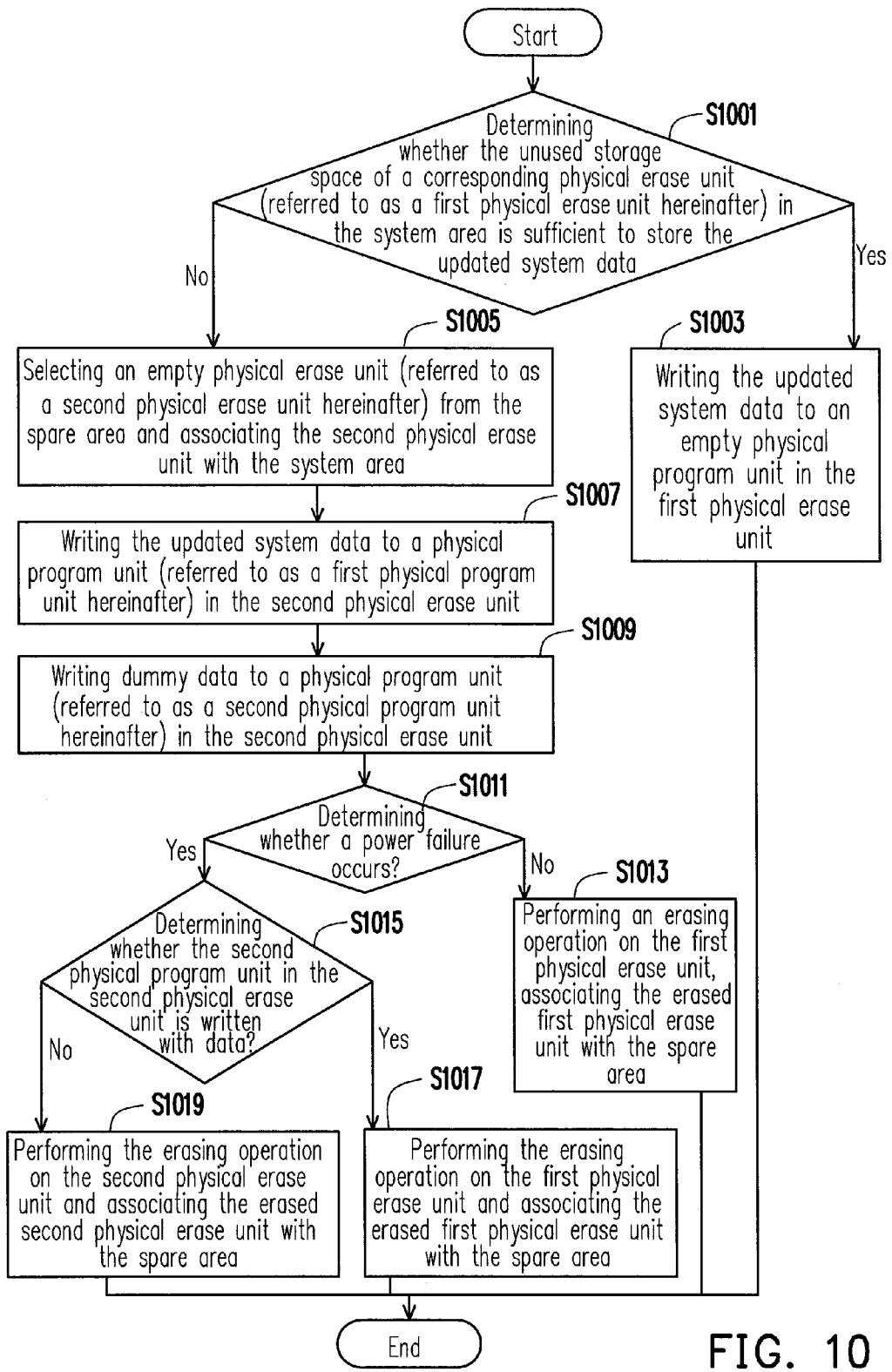
FIG. 10 is a flowchart of a method of storing system data according to an exemplary embodiment of the present invention.

FIG. 10 is a flowchart of a method of storing system data according to an exemplary embodiment of the present invention.

Referring to FIG. 10, when updated system data is about to be written to the rewritable non-volatile memory module 106, in step S1001, the memory controller 104 (or the memory management circuit 202) determines whether the unused storage space of a corresponding physical erase unit (referred to as a first physical erase unit hereinafter) in the system area 406 is sufficient to store updated system data.

If the unused storage space of the first physical erase unit is sufficient to store the updated system data, in step S1003, the memory controller 104 (or the memory management circuit 202) writes the updated system data to an empty physical program unit in the first physical erase unit. Afterward, the process illustrated in FIG. 10 is ended.

If the unused storage space of the first physical erase unit is insufficient to store the updated system data, in step S1005, the memory controller 104 (or the memory management circuit 202) selects an empty physical erase unit (referred to as a second physical erase unit hereinafter) from the spare area 404, and then, in step S1007, the memory controller 104 (or the memory management circuit 202) writes the updated system data to a physical program unit (referred to as a first physical program unit hereinafter) in the second physical erase unit. In the meantime, in step S1009, the memory controller 104 (or the memory management circuit 202) writes dummy data to a physical program unit (referred to as a second physical program unit hereinafter) in the second physical erase unit.

In step S1011, the memory controller 104 (or the memory management circuit 202) determines whether a power failure occurs.

If no power failure occurs, in step S1013, the memory controller 104 (or the memory management circuit 202) performs an erasing operation on the first physical erase unit, associates the erased first physical erase unit with the spare area 404 and associates the second physical erase unit with the system area 406. Thereafter, the process illustrated in FIG. 10 is ended. In particular, if no abnormal situation occurs during updating the system data, the memory controller 104 (or the memory management circuit 202) identifies that the updated system data is successfully written to the new system physical erase unit, while the data in the old system physical erase unit is erased.

If a power failure occurs, in step S1015, the memory controller 104 (or the memory management circuit 202) determines whether the second physical program unit in the second physical erase unit is written with data.

If data is already written to the second physical program unit in the second physical erase unit, in step S1017, the memory controller 104 (or the memory management circuit 202) performs the erasing operation on the first physical erase unit and associates the erased first physical erase unit with the spare area 404. Namely, in this case, the memory controller 104 (or the memory management circuit 202) identifies that the updated system data is successfully written to the new system physical erase unit and the data in the old system physical erase unit is erased.

If data is not written to the second physical program unit in the second physical erase unit, in step S1019, the memory controller 104 (or the memory management circuit 202) performs the erasing operation on the second physical erase unit and associates the erased second physical erase unit with the spare area 404. Namely, in this case, the memory controller 104 (or the memory management circuit 202) identifies that the updated system data is not successfully written the new system physical erase unit and the system data in the old system physical erase unit is used.

Figure 11:
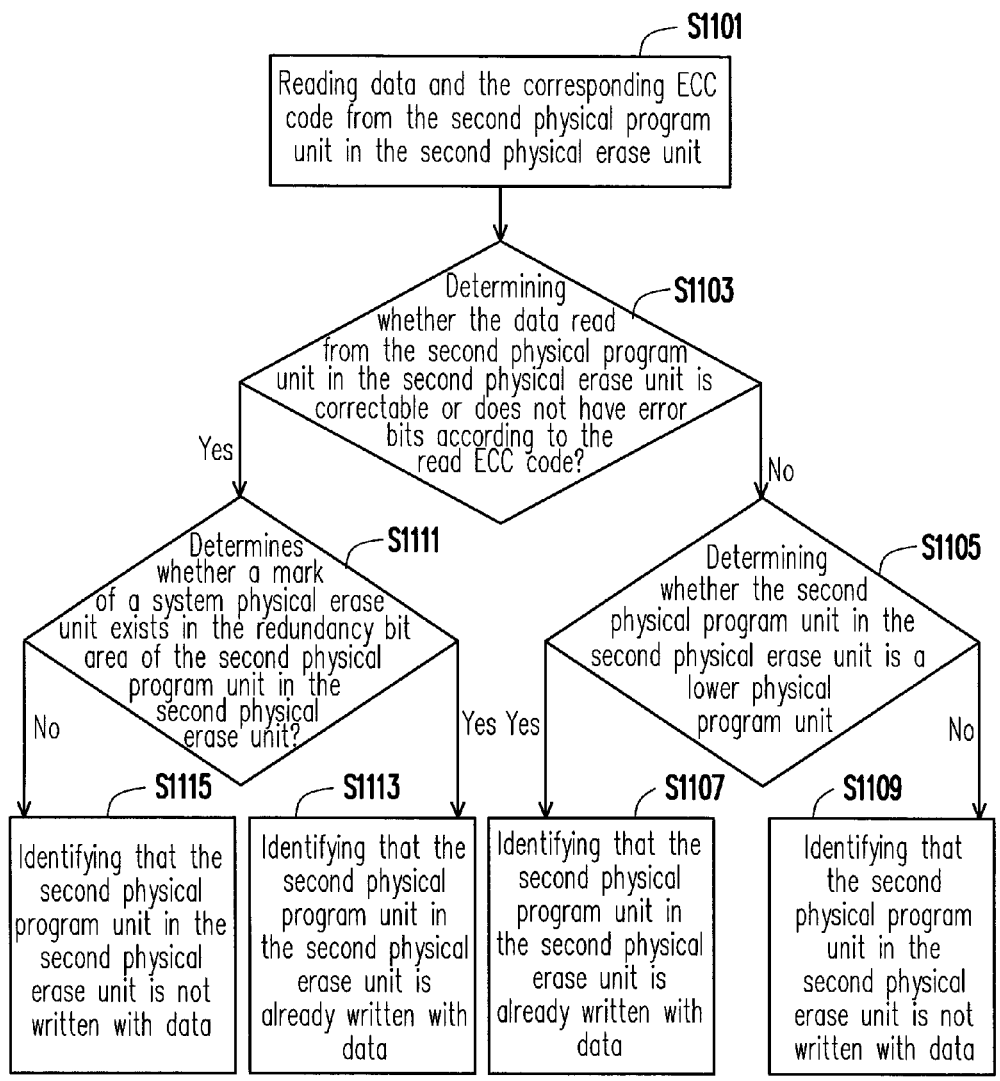
FIG. 11 is a detailed flowchart of determining whether data is written to the second physical program unit depicted in FIG. 10.

FIG. 11 is a detailed flowchart of determining whether data is written to the second physical program unit depicted in FIG. 10.

Referring to FIG. 11, in step S1101, the memory controller 104 (or the memory management circuit 202) reads data and the corresponding ECC code from the second physical program unit in the second physical erase unit.

In step S1103, the memory controller 104 (or the error checking and correcting circuit 256) determines whether the data read from the second physical program unit in the second physical erase unit is correctable or does not have error bits according to the read ECC code.

If the data read from the second physical program unit in the second physical erase unit is uncorrectable or has error bits, in step S1105, the memory controller 104 (or the memory management circuit 202) determines whether the second physical program unit in the second physical erase unit is a lower physical program unit.

If the second physical program unit in the second physical erase unit is a lower physical program unit, in step S1107, the memory controller 104 (or the memory management circuit 202) identifies that the second physical program unit in the second physical erase unit is already written with data. If the second physical program unit in the second physical erase unit is not the lower physical program unit, in step S1109, the memory controller 104 (or the memory management circuit 202) identifies that the second physical program unit in the second physical erase unit is not written with data.

If the data read from the second physical program unit in the second physical erase unit is correctable or does not have error bits, in step S1111, the memory controller 104 (or the memory management circuit 202) determines whether the mark of the system physical erase unit exists in the redundancy bit area of the second physical program unit in the second physical erase unit.

If the mark of the system physical erase unit exists in the redundancy bit area of the second physical program unit in the second physical erase unit, in step S1113, the memory controller 104 (or the memory management circuit 202) identifies that the second physical program unit in the second physical erase unit is already written with data.

If the mark of the system physical erase unit does not exist in the redundancy bit area of the second physical program unit in the second physical erase unit, in step S1115, the memory controller 104 (or the memory management circuit 202) identifies that the second physical program unit in the second physical erase unit is not written with data.

Based on the above, in the method of storing system data, the memory controller and the memory storage apparatus according to an exemplary embodiment of the present invention, the dummy data is written to the new system physical erase unit while the system physical erase units are changed. Also, by identifying whether the dummy data is written to the new system physical erase unit, whether the updated system data is successfully written to the new system physical erase unit is confirmed so as to ensure that the system data is securely stored. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of storing system data for a memory storage apparatus, wherein the memory storage apparatus comprises a rewritable non-volatile memory module, the rewritable non-volatile memory module comprises a plurality of physical erase units, each of the physical erase units comprises a plurality of physical program units, and a first physical erase unit among the physical erase units stores system data, the method comprising:
   determining whether an unused storage space of the first physical erase unit is sufficient to store updated system data; and
   if the unused storage space of the first physical erase unit is insufficient to store the updated system data, selecting a second physical erase unit from the physical erase units, writing the updated system data to at least one first physical program unit among the plurality of physical program units in the second physical erase unit and writing dummy data to a second physical program unit among the plurality of physical program units in the second physical erase unit.

2. The method of storing the system data according to claim 1, wherein the second physical program unit is arranged next to the first physical program unit in the second physical erase unit.

3. The method of storing the system data according to claim 1, further comprising:
   after the dummy data is successfully written to the second physical program unit in the second physical erase unit, performing an erasing operation on the first physical erase unit.

4. The method of storing the system data according to claim 1, further comprising:
   determining whether a power failure occurs in the memory storage apparatus;
   if the power failure occurs in the memory storage apparatus, determining whether the second physical program unit in the second physical erase unit is written with data;
   if the second physical program unit in the second physical erase unit is determined as being written with data, performing an erasing operation on the first physical erase unit; and
   if the second physical program unit in the second physical erase unit is determined as being unwritten with data, performing the erasing operation on the second physical erase unit.

5. The method of storing the system data according to claim 4, wherein the steps of determining whether the second physical program unit in the second physical erase unit is written with data comprise:
   reading data and an error checking and correcting (ECC) code corresponding thereto from the second physical program unit in the second physical erase unit;
   determining whether the data read from the second physical program unit in the second physical erase unit is correctable or does not have error bits according to the ECC code;
   if the data read from the second physical program unit in the second physical erase unit is uncorrectable or has error bits, identifying the second physical program unit in the second physical erase unit as being written with data.

6. The method of storing the system data according to claim 5, wherein the steps of determining the second physical program unit in the second physical erase unit is written with data further comprise:
   if the data read from the second physical program unit in the second physical erase unit is correctable or does not have error bits, determining whether a mark of a system physical erase unit exits in a redundancy bit area of the second physical program unit in the second physical erase unit; and if the mark of the system physical erasing unit exits in the redundancy bit area of the second physical program unit in the second physical erase unit, identifying the second physical program unit in the second physical erase unit as being written with data.

7. The method of storing the system data according to claim 5, wherein the plurality of physical program units of each of the physical erase units is partitioned into a plurality of lower physical program units and a plurality of upper physical program units, and a speed of writing data to the plurality of lower physical program units is faster than a speed of writing data to the plurality of upper physical program units,
   wherein the first physical program unit in the second physical erase unit belongs to one of the lower physical program units, the second physical program unit in the second physical erase unit is an upper physical program unit among the upper physical program units corresponding to the first physical program unit in the second physical erase unit,
   wherein the steps of determining whether the second physical program unit in the second physical erase unit is written with data further comprises:
      if the data read from the second physical program unit in the second physical erase unit is correctable or does not have error bits, determining whether a mark of a system physical erase unit exists in a redundancy bit area of the second physical program unit in the second physical erase unit; and
      if the mark of the system physical erase unit exists in the redundancy bit area of the second physical program unit in the second physical erase unit, identifying the second physical program unit in the second physical erase unit as being written with data.

8. The method of storing the system data according to claim 1, wherein the plurality of physical program units of each of the physical erase units is partitioned into a plurality of lower physical program units and a plurality of upper physical program units, and a speed of writing data to the plurality of lower physical program units is faster than a speed of writing data to the plurality of upper physical program units,
   wherein the first physical program unit and the second physical program unit in the second physical erase unit belong to the plurality of lower physical program units.

9. A memory controller, for controlling a rewritable non-volatile memory module, wherein the rewritable non-volatile memory module comprises a plurality of physical erase units, and each of the physical erase units comprises a plurality of physical program units, the memory controller comprising:
   a host interface, configured to be coupled to a host system;
   a memory interface, configured to be coupled to the rewritable non-volatile memory module; and
   a memory management circuit, configured to be coupled to the host interface and the memory interface,
   wherein the memory management circuit is configured to store system data to a first physical erase unit among the plurality of physical erase units,
   wherein the memory management circuit is further configured to determine whether an unused storage space of the first physical erase unit is sufficient to store updated system data,
   if the unused storage space of the first physical erase unit is insufficient to store the updated system data, the memory management circuit is further configured to select a second physical erase unit from the physical erase units, write the updated system data to at least one first physical program unit among the plurality of physical program units in the second physical erase unit and write dummy data to a second physical program unit among the plurality of physical program units in the second physical erase unit.

10. The memory controller according to claim 9, wherein the second physical program unit is arranged next to the first physical program unit in the second physical erase unit.

11. The memory controller according to claim 9, wherein the memory management circuit is further configured to perform an erasing operation on the first physical erase unit after the dummy data is successfully written to the second physical program unit in the second physical erase unit.

12. The memory controller according to claim 9, wherein the memory management circuit is further configured to determine whether a power failure occurs,
   if the power failure occurs, the memory management circuit is further configured to determine whether the second physical program unit in the second physical erase unit is written with data,
   if the second physical program unit in the second physical erase unit is written with data, the memory management circuit is further configured to perform an erasing operation on the first physical erase unit,
   if the second physical program unit in the second physical erase unit is not written with data, the memory management circuit is further configured to perform the erasing operation on the second physical erase unit.

13. The memory controller according to claim 12, further comprising an error checking and correcting circuit,
   wherein the memory management circuit is configured to read data and an error checking and correcting (ECC) code corresponding thereto from the second physical program unit in the second physical erase unit, and the error checking and correcting circuit is configured to determine whether the data read from the second physical program unit in the second physical erase unit is correctable or does not have error bits according to the ECC code,
   if the data read from the second physical program unit in the second physical erase unit is uncorrectable, the memory management circuit is configured to identify the second physical program unit in the second physical erase unit as being written with data.

14. The memory controller according to claim 13, wherein if the data read from the second physical program unit in the second physical erase unit is correctable or does not have error bits, the memory management circuit is configured to determine whether a mark of a system physical erase unit exits in a redundancy bit area of the second physical program unit in the second physical erase unit,
   if the mark of the system physical erase unit exits in the redundancy bit area of the second physical program unit in the second physical erase unit, the memory management circuit is configured to identify the second physical program unit in the second physical erase unit as being written with data.

15. The memory controller according to claim 13, wherein the plurality of physical program units of each of the physical erase units is partitioned into a plurality of lower physical program units and a plurality of upper physical program units, and a speed of writing data to the plurality of lower physical program units is faster than a speed of writing data to the plurality of upper physical program units,
   wherein the first physical program unit in the second physical erase unit belongs to one of the lower physical program units, the second physical program unit in the second physical erase unit is an upper physical program unit among the upper physical program units corresponding to the first physical program unit in the second physical erase unit,
wherein if the data read from the second physical program unit in the second physical erase unit is correctable or does not have error bits, the memory management circuit is configured to determine whether a mark of a system physical erase unit exists in a redundancy bit area of the second physical program unit in the second physical erase unit,
if the mark of the system physical erase unit exists in the redundancy bit area of the second physical program unit in the second physical erase unit, the memory management circuit is configured to identify the second physical program unit in the second physical erase unit as being written with data.

16. The memory controller according to claim 9, wherein the plurality of physical program units of each of the physical erase units is partitioned into a plurality of lower physical program units and a plurality of upper physical program units, and a speed of writing data to the plurality of lower physical program units is faster than a speed of writing data to the plurality of upper physical program units, and
wherein the first physical program unit and the second physical program unit in the second physical erase unit belong to the plurality of lower physical program units.

17. A memory storage apparatus, comprising:
a connector, configured to be coupled to a host system;
a rewritable non-volatile memory module, comprising a plurality of physical erase units, each of the physical erase unit comprising a plurality of physical program units; and
a memory controller, coupled to the connector and the rewritable non-volatile memory module,
wherein the memory controller is configured to store system data to a first physical erase unit among the plurality of physical erase units,
wherein the memory controller is further configured to determine whether an unused storage space of the first physical erase unit is sufficient to store updated system data,
if the unused storage space of the first physical erase unit is insufficient to store the updated system data, the memory controller is further configured to select a second physical erase unit from the physical erase units, write the updated system data to at least one first physical program unit among the plurality of physical program units in the second physical erase unit and write dummy data to a second physical program unit among the plurality of physical program units in the second physical erase unit.

18. The memory storage apparatus according to claim 17, wherein the second physical program unit is arranged next to the first physical program unit in the second physical erase unit.

19. The memory storage apparatus according to claim 17, wherein the memory controller is further configured to perform an erasing operation on the first physical erase unit after the dummy data is successfully written to the second physical program unit in the second physical erase unit.

20. The memory storage apparatus according to claim 17, wherein the memory controller is further configured to determine whether a power failure occurs,
if the power failure occurs, the memory controller is further configured to determine whether the second physical program unit in the second physical erase unit is written with data,
if the second physical program unit in the second physical erase unit is written with data, the memory controller is further configured to perform an erasing operation on the first physical erase unit,
if the second physical program unit in the second physical erase unit is not written with data, the memory controller is further configured to perform the erasing operation on the second physical erase unit.

21. The memory storage apparatus according to claim 20, wherein the memory controller is configured to read data and an error checking and correcting (ECC) code corresponding thereto from the second physical program unit in the second physical erase unit and determine whether the data read from the second physical program unit in the second physical erase unit is correctable or does not have error bits according to the ECC code,
if the data read from the second physical program unit in the second physical erase unit is uncorrectable, the memory controller is configured to identify the second physical program unit in the second physical erase unit as being written with data.

22. The memory storage apparatus according to claim 21, wherein if the data read from the second physical program unit in the second physical erase unit is correctable or does not have error bits, the memory controller is configured to determine whether a mark of a system physical erase unit exits in a redundancy bit area of the second physical program unit in the second physical erase unit,
if the mark of the system physical erase unit exits in the redundancy bit area of the second physical program unit in the second physical erase unit, the memory controller is configured to identify the second physical program unit in the second physical erase unit as being written with data.

23. The memory storage apparatus according to claim 21, wherein the plurality of physical program units of each of the physical erase units is partitioned into a plurality of lower physical program units and a plurality of upper physical program units, and a speed of writing data to the plurality of lower physical program units is faster than a speed of writing data to the plurality of upper physical program units,
wherein the first physical program unit in the second physical erase unit belongs to one of the lower physical program units, the second physical program unit in the second physical erase unit is an upper physical program unit among the upper physical program units corresponding to the first physical program unit in the second physical erase unit,
wherein if the data read from the second physical program unit in the second physical erase unit is correctable or does not have error bits, the memory controller is configured to determine whether a mark of a system physical erase unit exists in a redundancy bit area of the second physical program unit in the second physical erase unit,
if the mark of the system physical erasing unit exists in the redundancy bit area of the second physical program unit in the second physical erase unit, the memory controller is configured to identify the second physical program unit in the second physical erase unit as being written with data.

24. The memory storage apparatus according to claim 17, wherein the plurality of physical program units of each of the physical erase units is partitioned into a plurality of lower physical program units and a plurality of upper physical program units, and a speed of writing data to the plurality of lower physical program units is faster than a speed of writing data to the plurality of upper physical program units, and
wherein the first physical program unit and the second physical program unit in the second physical erase unit belong to the plurality of lower physical program units.

* * * * *